(12) United States Patent
Mouri et al.

(10) Patent No.: US 7,987,488 B2
(45) Date of Patent: Jul. 26, 2011

(54) SYSTEM FOR TRANSMITTING AND RECEIVING DATA

(75) Inventors: Masaya Mouri, Chiba (JP); Kenichi Sakusabe, Kanagawa (JP)

(73) Assignee: Sony Corporation, Tokyo (JP)

(*) Notice: Subject to any disclaimer, the term of this patent is extended or adjusted under 35 U.S.C. 154(b) by 702 days.

(21) Appl. No.: 11/508,838

(22) Filed: Aug. 24, 2006

(65) Prior Publication Data
US 2007/0067524 A1 Mar. 22, 2007

(30) Foreign Application Priority Data
Aug. 30, 2005 (JP) ................................. 2005-250315

(51) Int. Cl.
| H04N 7/18 | (2006.01) |
| H04N 7/173 | (2006.01) |
| G06F 9/32 | (2006.01) |
| G06F 15/16 | (2006.01) |
| G06F 13/00 | (2006.01) |
| G06F 13/362 | (2006.01) |
| H03K 17/00 | (2006.01) |
| H04L 12/42 | (2006.01) |
| H04L 12/403 | (2006.01) |
| H04J 3/04 | (2006.01) |

(52) U.S. Cl. .......... 725/78; 725/120; 340/2.1; 340/2.23; 370/450; 370/536; 709/230; 710/100; 710/107; 710/116

(58) Field of Classification Search ........................ None
See application file for complete search history.

(56) References Cited

U.S. PATENT DOCUMENTS
| 5,396,602 | A | * | 3/1995 | Amini et al. ................. 710/113 |
| 5,621,902 | A | * | 4/1997 | Cases et al. ................... 710/308 |
| 5,699,532 | A | * | 12/1997 | Barrett et al. ................. 710/305 |
| 6,192,082 | B1 | | 2/2001 | Moriarty et al. |
| 6,813,656 | B1 | * | 11/2004 | Odenwald et al. ............. 710/38 |
| 6,983,330 | B1 | * | 1/2006 | Oliveira et al. ............... 709/239 |
| 7,085,875 | B1 | * | 8/2006 | Yona et al. .................... 710/307 |
| 7,383,353 | B2 | * | 6/2008 | Valdevit et al. ............... 709/241 |
| 2002/0118296 | A1 | | 8/2002 | Schwab et al. |
| 2005/0021751 | A1 | * | 1/2005 | Block et al. .................. 709/225 |
| 2005/0228943 | A1 | * | 10/2005 | DeCenzo et al. ............. 711/114 |
| 2005/0265395 | A1 | * | 12/2005 | Kim et al. ..................... 370/485 |
| 2009/0007185 | A1 | * | 1/2009 | Nix et al. ........................ 725/62 |

FOREIGN PATENT DOCUMENTS
| GB | 2 332 345 A | 6/1999 |
| JP | 5-207208 | 8/1993 |
| JP | 2003-289315 | 10/2003 |

* cited by examiner

*Primary Examiner* — Hunter B Lonsberry
*Assistant Examiner* — James R Marandi
(74) *Attorney, Agent, or Firm* — Oblon, Spivak, McClelland, Maier & Neustadt, L.L.P.

(57) ABSTRACT

A system for transmitting and receiving image and audio data that is information on any of image and audio has a transmission apparatus and a reception apparatus. The transmission apparatus transmits the image and audio data using a multi-channel communication system and includes a first protocol conversion device. The reception apparatus receives the image and audio data using the multi-channel communication system and includes a second protocol conversion device. The transmission apparatus performs data conversion processing on the image and audio data by the first protocol conversion device using a protocol to produce parallel image and audio data, and transmits it to the reception apparatus using the multi-channel communication system. The reception apparatus receives the parallel data to perform data conversion processing on the parallel data using the protocol by the second protocol conversion device to return to the image and audio data.

14 Claims, 6 Drawing Sheets

… (1) SYSTEM FOR TRANSMITTING AND RECEIVING DATA

CROSS REFERENCE TO RELATED APPLICATION

The present invention contains subject matter related to Japanese Patent Application JP 2005-250315 filed in the Japanese Patent Office on Aug. 30, 2005, the entire contents of which being incorporated herein by reference.

BACKGROUND OF THE INVENTION

1. Field of the Invention

The present invention relates to a system for transmitting and receiving data in which a base station transmits image and audio data that is information on image and/or audio to a monitor and the monitor receives the image and audio data and reproduces and displays the received image and audio data; a transmission apparatus therefor; a reception apparatus therefor; and a method for transmitting and receiving such the data.

2. Description of Related Art

In recent years, as a kind of wireless LAN systems constructed within limited areas such as a house and an office, utilized has been a system for transmitting and receiving data which includes, in combination, a base device that serves as an information source or an access point, and a display terminal that acquires information from the base device through a wireless communication system with the base station and displays it. For example, the base device incorporates or is connected with a television tuner for receiving broadcast signal, and is connected with a telephone line via a modem.

The display terminal, for example, transmits a request for acquiring television image to the base device, or receives the television image from the base device. Further, the display terminal also transmits and receives electronic mails via the base device or receives information on the Internet. Then, the display terminal displays the received image and information on its display. The base device, when receiving the request for acquiring the television image from the display terminal, reads the television image from a storing device thereof, and transmits it to the display terminal. Further, when the base device receives from the display terminal, for example, a request for receiving electronic mails, the base device acquires the electronic mails from the mail server thereof and transfers them to the display terminal.

According to such the system for transmitting and receiving data, the display terminal is capable of acquiring information from the base device through wireless communication system, and accessing information on the Internet through the base device. In this manner, a plurality of display terminals can share one and the same base device, and as a result, they can share the same information and cost reduction is achieved.

FIG. 1 shows a configuration of a control system relative to a system 200 for transmitting and receiving data as related art.

A transmission apparatus 201 in the system 200 receives, for example, an image and audio broadcast signal such as a television broadcast signal via a television tuner 265. An AV encoder 202 then receives digital AV (Audio and Visual) data contained in the television broadcast signal and compresses the AV data according to a predetermined image and audio compression scheme. A storing device 206 receives the AV data from the AV encoder 202 via a PCI bus line 203, a Host PCI bridge 204, and a Host bus line 205, and stores it. At the same time, a DMA controller 207 performs any data transfer controls under a so-called bus master condition such that the CPU 208 can utilizes the bus lines preferentially to reduce the processing load to the CPU 208. The stored AV data is output to a PCI controller 209 via the Host bus line 205, the Host PCI bridge 204, and the PCI bus line 203. The PCI controller 209 then outputs the AV data to a protocol-processing section 211 via a PCI internal bus 210. The protocol-processing section 211 performs on the AV data any processing based on a predetermined communication protocol conversion.

The transmission apparatus 201 then converts the AV data converted due to the protocol to transmission data and transmits it as a radio signal to a reception apparatus 251 of the system 200 for transmitting and receiving data via a transmitting and receiving section 212 and an antenna 213. At this time, the transfer efficiency in the protocol-processing section 211 is about 30 Mbps at the maximum, for example, whereas the transmission efficiency in the transmitting and receiving section 212 is about 54 Mbps at the maximum.

The reception apparatus 251 receives the radio signal from the transmission apparatus 201 as reception data by a transmitting and receiving section 253 via an antenna 252 of the reception apparatus 251. The transmitting and receiving section 253 transfers it to a protocol-processing section 254. At the same time, the DMA controller 255 performs any data transfer controls under a so-called bus master condition such that it can utilizes the bus lines preferentially to reduce the processing load to a CPU 259. The protocol-processing section 254 converts the reception data into AV data. A storing device 258 then receives the AV data via a PCI internal bus 256, a PCI controller 257, a PCI bus line 262, a Host PCI bridge 261, and a Host bus line 260, and stores it. The stored AV data is transferred to an AV decoder 263 via the Host bus line 260, the Host PCI bridge 261, and the PCI bus line 262. The AV decoder 263 performs any extension processing on the AV data according to a predetermined image and audio extension scheme. As a result, an image and audio signal such as a television signal can be reproduced.

As to the base device equipped with the data transfer ability like the above-described case, Japanese Patent Application Publication No. 2003-289315 discloses a packet transfer device. The packet transfer device includes an Ethernet (trade name) controller, a wireless LAN controller, a CPU bus, a data bus, a bus bridge, a local memory, a buffer memory and a CPU. The Ethernet (trade name) controller and the wireless LAN controller directly connect the CPU bus. A header portion of the received packet is stored in the local memory on the CPU bus. The data portion of the received packet is stored in the buffer memory on the data bus. In this manner, direct access from the CPU, the Ethernet (trade name) controller, and the wireless LAN controller is enabled while bypassing the bus bridge. Further, since the data bus is independent from the CPU bus, the packet transfer performed on the CPU bus is not hindered by the transfer of the data portion, thereby reducing the time for processing the packet transfer.

SUMMARY OF THE INVENTION

In the above system 200 for transmitting and receiving data, however, when the mass image and audio data stored in the storing device 206 is transmitted from the antenna 213 connected to the transmitting and receiving section 212 to the reception apparatus 251, the transmission apparatus 201 has only one path for the data to be transferred to the protocol-processing section 211 via the Host bus line 205, the Host PCI bridge 204, the PCI bus line 203, the PCI controller 209, and the PCI internal bus 210. In this configuration, it is difficult to transfer such the mass image and audio data stored in the storing device 206 to the protocol-processing section 211 at high speed. This causes throughput in the protocol-processing section 211 to be not optimum.

Further, as is seen in the above Japanese Patent Application Publication, since all the header portions of items of packet data are transferred on the CPU bus, the traffic on the CPU bus is heavy to take any long time for protocol conversion processing.

It is desirable to provide a system for transmitting and receiving data, a transmission apparatus therefor, a reception apparatus therefor, and a method for transmitting and receiving the data, that are capable of enhancing throughput in a protocol conversion device and transmitting the mass image and audio data at high speed.

According to an embodiment of the present invention, there is provided a system for transmitting and receiving image and audio data that is information on any of image and audio. The system has a transmission apparatus that transmits the image and audio data using a multi-channel communication system and a reception apparatus that receives the image and audio data using the multi-channel communication system. The transmission apparatus includes a first protocol conversion device. The reception apparatus includes a second protocol conversion device. The transmission apparatus performs data conversion processing on the image and audio data by the first protocol conversion device using a protocol to produce parallel image and audio data, and transmits the parallel image and audio data to the reception apparatus using the multi-channel communication system. The reception apparatus receives the parallel image and audio data from the transmission apparatus using the multi-channel communication system, and performs data conversion processing on the parallel image and audio data using the protocol by the second protocol conversion device to return to the image and audio data.

According to the embodiment of a system for transmitting and receiving data relative to the present invention, when the image and audio data is transmitted and received by using the multi-channel communication system, the transmission apparatus performs data conversion processing on the image and audio data using a protocol to produce parallel image and audio data. The transmission apparatus then transmits the parallel image and audio data to the reception apparatus by using the multi-channel communication system. For example, the transmission apparatus further includes multiple paths that transfers the image and audio data to the first protocol conversion device, a control device, and a data bus; and the control device monitors a state of use of the image and audio data in the data bus, and controls the multiple paths to be used for transferring the image and audio data based on the state of use. Therefore, the image and audio data can be transferred to the protocol conversion device utilizing an unoccupied path, and the parallel image and audio data converted using the protocol can be transmitted to the reception apparatus by using the multi-channel communication system. Due to this configuration, the throughput in the protocol conversion device is enhanced and the image and audio data can be transmitted at high speed.

According to another embodiment of the present invention, there is provided a transmission apparatus that transmits image and audio data, which is information on any of image and audio, using a multi-channel communication system. The transmission apparatus has protocol conversion device that performs data conversion processing on the image and audio data using a protocol to produce parallel image and audio data. The transmission apparatus also has data transmission device that transmits to a reception apparatus using the multi-channel communication system the parallel image and audio data converted by the protocol conversion device.

According to the embodiment of the transmission apparatus relative to the present invention, when the mass image and audio data are transmitted using the multi-channel communication system, the transmission apparatus performs data conversion processing on the image and audio data using the protocol to produce parallel image and audio data. The parallel image and audio data converted by using the protocol is transmitted to the reception apparatus using the multi-channel communication system. For example, the transmission apparatus further has a storing device that stores the image and audio data, multiple paths connected between the protocol conversion device and the storing device, a data bus, and a control device that monitors a state of use of the image and audio data in the data bus and controls the multiple paths to be used for reading the image and audio data from the storing device based on the state of use. Therefore, the image and audio data can be transferred to the protocol conversion device utilizing an unoccupied path, and the parallel image and audio data converted using the protocol can be transmitted to the reception apparatus by using the multi-channel communication system. Due to this configuration, the throughput in the protocol conversion device is enhanced and the image and audio data can be transmitted at high speed.

According to further embodiment of the present invention, there is provided a reception apparatus that receives image and audio data, which is information on any of image and audio, using a multi-channel communication system. The reception apparatus has a data-receiving device that receives the image and audio data from a transmission apparatus using the multi-channel communication system, and a protocol conversion device that performs data conversion processing on the received image and audio data using a protocol to return the received image and audio data to its original image and audio data.

According to the embodiment of the reception apparatus relative to the present invention, when the mass image and audio data is received using the multi-channel communication system, the reception apparatus receives the parallel image and audio data converted using the protocol in the transmission apparatus using the multi-channel communication system, and performs the data conversion processing on the received parallel image and audio data using the same protocol as one used in the transmission apparatus. For example, the reception apparatus further has a storing device that stores the image and audio data, multiple paths connected between the protocol conversion device and the storing device, a data bus, and a control device that monitors a state of use of the image and audio data in the data bus, and controls the multiple paths to be used for transferring the image and audio data to the storing device based on the state of use. Therefore, the reception apparatus can receive the parallel image and audio data using the multi-channel communication system and transfers the original image and audio data to the storing device utilizing an unoccupied path. This enables the original image and audio data to be transferred to the storing device at high speed.

According to additional embodiment of the present invention, there is provided a method for transmitting and receiving image and audio data, which is information on any of image and audio, between a transmission apparatus and a reception apparatus using a multi-channel communication system. The method includes the steps of performing data conversion processing on the image and audio data using a protocol to produce parallel image and audio data in the transmission apparatus; transmitting the parallel image and audio data to the reception apparatus using the multi-channel communication system by the transmission apparatus; receiving the parallel image and audio data from the transmission apparatus using the multi-channel communication system by the reception apparatus; and performing data conversion processing on the parallel image and audio data thus received using the protocol in the reception apparatus to return to the image and audio data.

According to the embodiment of the method for transmitting and receiving data relative to the present invention, when the mass image and audio data is transmitted and received between the transmission apparatus and the reception apparatus using the multi-channel communication system, the transmission apparatus performs data conversion processing on the image and audio data using the protocol to produce parallel image and audio data, and transmits the parallel image and audio data to the reception apparatus using the multi-channel communication system. The reception apparatus receives the parallel image and audio data using the multi-channel communication system, and performs data conversion processing on the received parallel image and audio data using the same protocol as one used in the transmission apparatus. Due to this configuration, the throughput in the protocol conversion device in the transmission apparatus is enhanced and the image and audio data can be transmitted at high speed.

The concluding portion of this specification particularly points out and directly claims the subject matter of the present invention. However those skilled in the art will best understand both the organization and method of operation of the invention, together with further advantages and objects thereof, by reading the remaining portions of the specification in view of the accompanying drawing(s) wherein like reference characters refer to like elements.

DESCRIPTION OF THE PREFERRED EMBODIMENTS OF THE INVENTION

The following will describe embodiments of a system for transmitting and receiving data, a transmission device, and a reception device, and a method for transmitting and receiving data according to the present invention with reference to the drawings.

Figure 1:
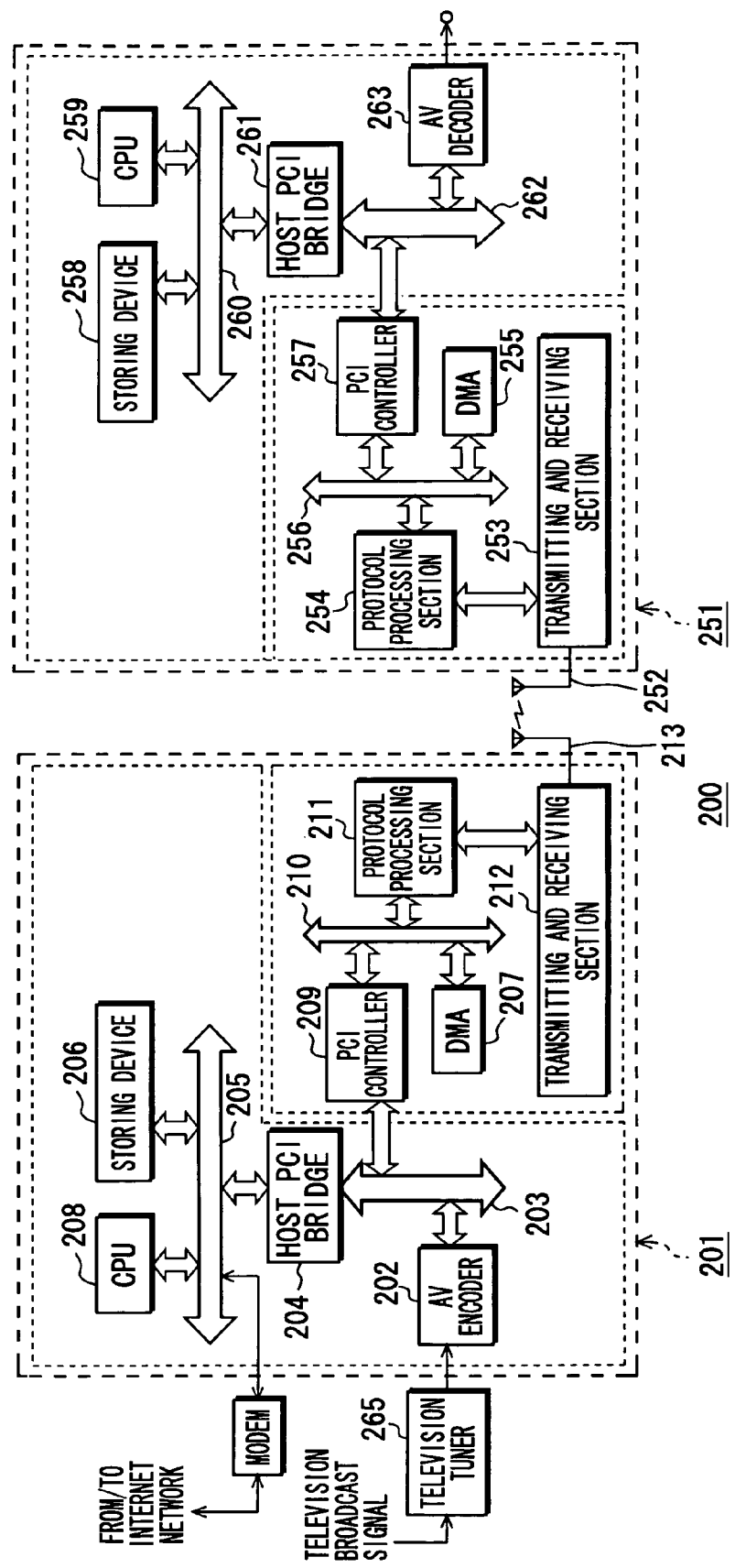
FIG. 1 is a block diagram for showing a configuration of a control system in a system for transmitting and receiving data as related art.
Figure 2:
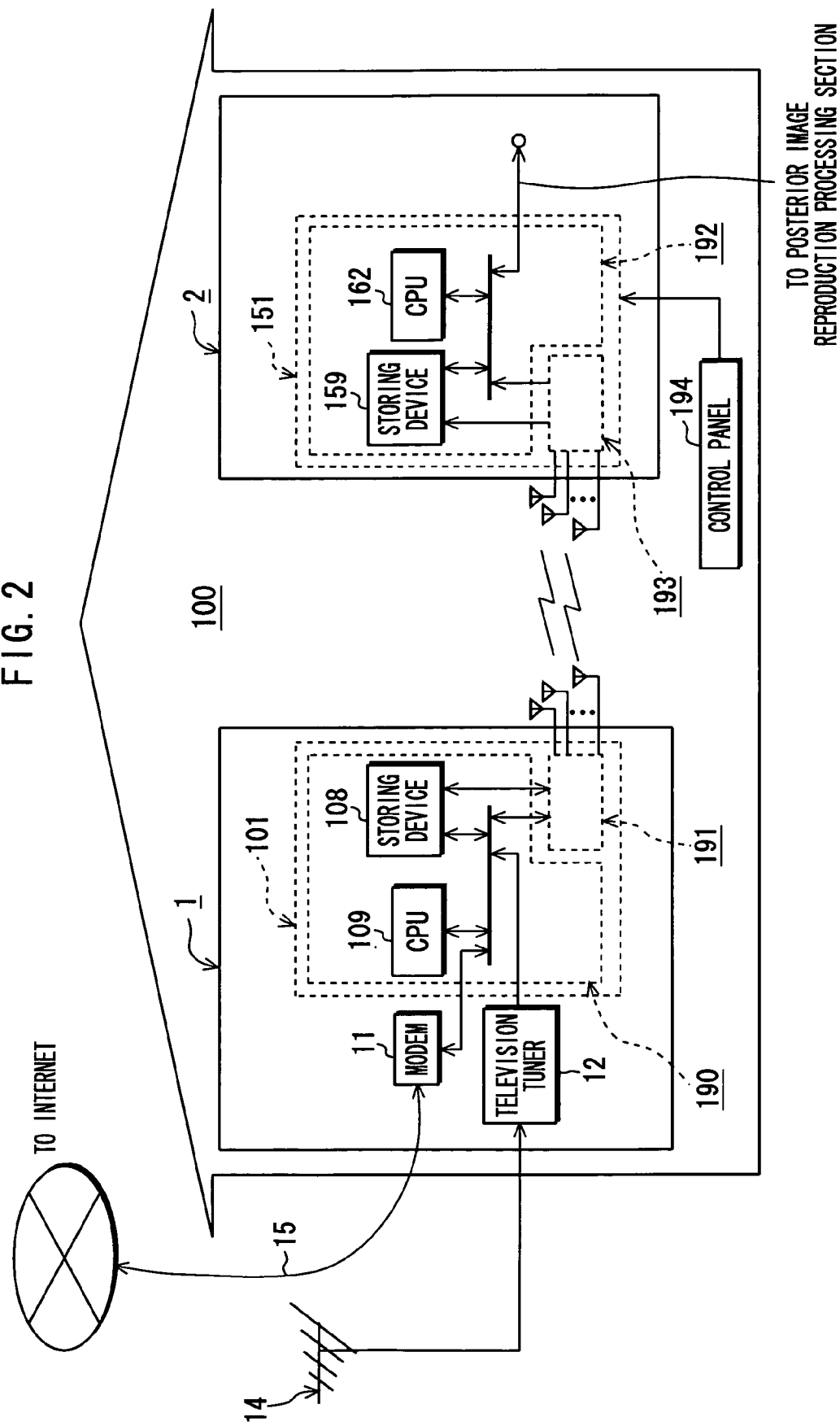
FIG. 2 is a conceptual diagram for showing a configuration of an embodiment of a system for transmitting and receiving data according to the present invention.

FIG. 2 shows a configuration of an embodiment of the system 100 for transmitting and receiving data according to the present invention.

In this embodiment, when image and audio data that is mass information on image and/or audio is transmitted and received between a base station device 1 and a monitoring device 2 using a multi-channel communication system, the base station device 1 converts the image and audio data to parallel data using a protocol, and transmits the converted parallel image and audio data to the monitoring device 2 using the multi-channel communication system. The monitoring device 2 receives the parallel image and audio data using the multi-channel communication system, and converts the parallel image and audio data to serial image and audio data using the protocol. This enables throughput in a protocol conversion device to be enhanced, thereby allowing the mass image and audio data to be transmitted at high speed.

The system 100 for transmitting and receiving data shown in FIG. 2 has a transmission device and a reception device. The transmission device transmits image and audio data that is mass information on image and/or audio to the reception device using a multi-channel communication system. The reception device receives the image and audio data from the transmission device using the multi-channel communication system. The system 100 includes, for example, a base station device 1 and a monitoring device 2.

The base station device 1 is an example of a transmission device and includes, for example, a modem 11, a television tuner 12, and a base station control unit 101.

The modem 11 is connected to a telephone line 15. The modem 11 converts an audio signal received through the telephone line 15 into digital data, or converts the digital data received from the base station control unit 101 into an audio signal to send the audio signal thus converted to the telephone line 15. For example, when a music file is downloaded from the Internet, the modem 11 receives the music file as an audio signal through the telephone line 15, and converts it into digital data.

The television tuner 12 is connected to a television antenna 14. The television tuner 12 converts a television signal received by the television antenna 14 into a visual-aural television image signal, and then converts it into television image data.

The base station control unit 101 is connected to the modem 11 and the television tuner 12, and includes a CPU block 190 and a PCI block 191. The CPU block 190 is connected to the modem 11 and the television tuner 12, and includes, for example, a CPU 109 and a storing device 108. In the CPU block 190, the CPU 109 controls the storing device 108 to store the mass image and audio data received from the modem 11 therein or to read the stored image and audio data therefrom and transfer it to the PCI block 191.

The PCI block 191 receives the image and audio data and performs any processing for transmitting the image and audio data from the antenna to the monitoring device 2 as a radio image and audio signal. The image and audio data relates to data on television image information, music information, and homepage information, and hereinafter, is referred to as AV (audio and visual) data.

The monitoring device 2 is an example of the reception device, and includes, for example, a monitor control unit 151 and a control panel 194. The control panel 194 is used for, for example, issuing a request for reproducing and displaying information such as television image information, homepage information, and the like. The monitor control unit 151 includes a PCI block 193 and a CPU block 192. The PCI block 193 receives the radio image and audio signal from the base station device 1 by the antenna, and converts the received radio image and audio signal into AV data to output it into the CPU block 192. The CPU block 192 is connected to the PCI block 193, and includes, for example, a CPU 162 and a storing device 159. In the CPU block 192, the CPU 162 controls the storing device 159 to stores the AV data output from the PCI block 193 thereinto or to read the stored AV data and transfer it to a posterior image reproduction processing section (not shown).

Figure 3:
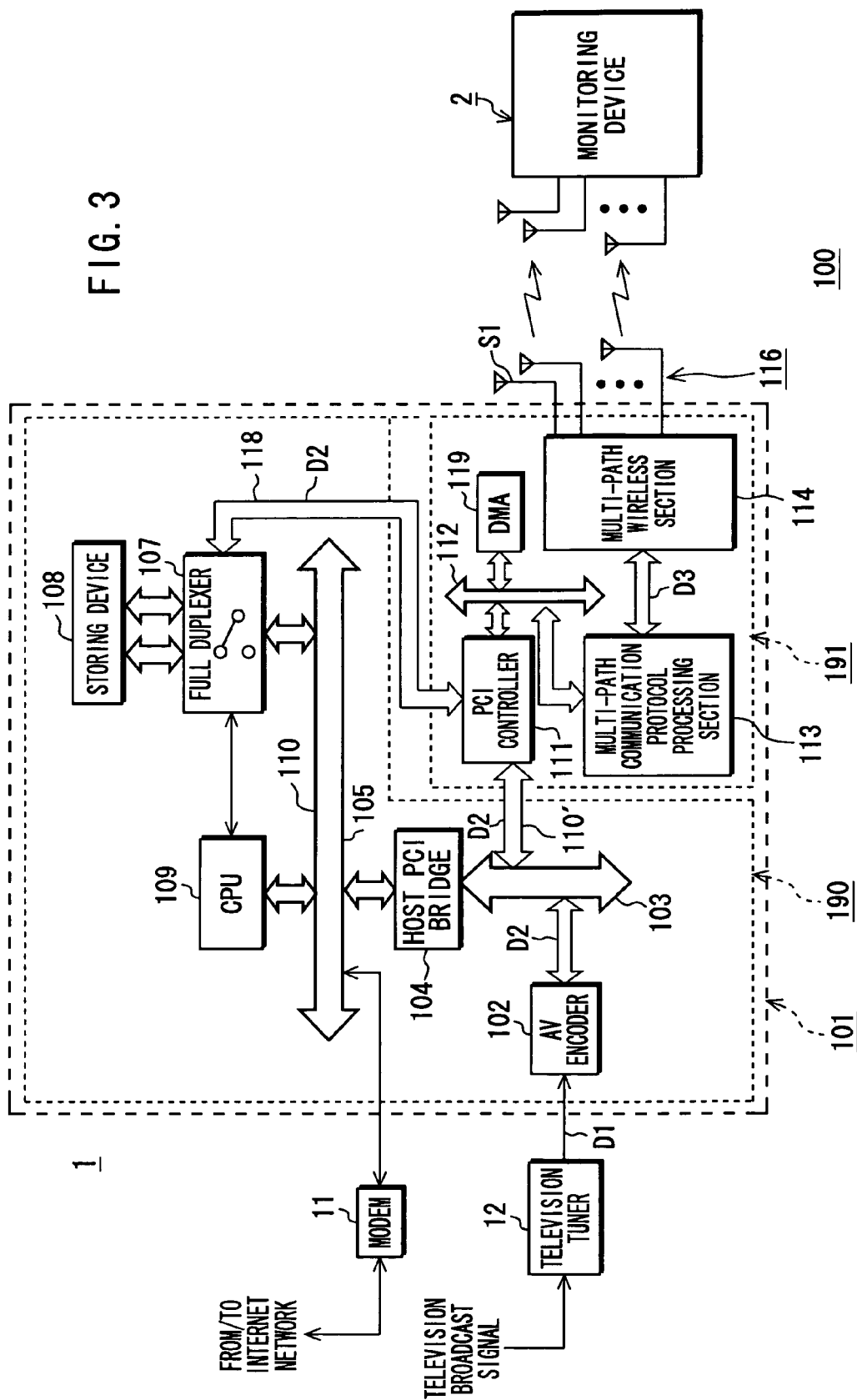
FIG. 3 is a block diagram for showing a configuration of a control system of an embodiment of a transmission device, for example, a base station device, which is used in the system for transmitting and receiving data, according to the invention.

FIG. 3 shows a configuration of a control system of the base station device 1 in the system 100 for transmitting and receiving data. In the system 100 for transmitting and receiving data shown in FIG. 3, the base station control unit 101 is connected to the modem 11 and the television tuner 12, and includes the CPU block 190 and the PCI block 191.

The CPU block 190 is connected to the modem 11 and the television tuner 12, and includes an AV encoder 102, a PCI bus line 103, a Host PCI bridge 104, a Host bus line 105, a Full Duplexer 107, a storing device 108, a CPU 109, a bus 110' constituting a part of a first path 110 (which will be described later in detail), and a second path 118.

The AV encoder 102 is connected to the television tuner 12, and performs, for example, data compression to AV data D1. The AV encoder 102 outputs the compressed AV data D2 to the Host PCI bridge 104 via the PCI bus line 103.

The Host PCI bridge 104 is connected to the AV encoder 102 via the PCI bus line 103, and transfers the AV data D2 to the storing device 108 via the Host bus line 105 and the Full Duplexer 107.

The storing device 108 is connected to the Host PCI bridge 104 via the Full Duplexer 107 and the Host bus line 105, and stores the AV data D2 transferred from the Host PCI bridge 104. The Full Duplexer 107 is connected to the CPU 109, which controls its switch.

The Full Duplexer 107 has an ability of transmitting and receiving data to and from the storing device 108 in parallel bidirectionally at one time, and also has an ability of switching multiple paths (which will be described in detail) depending on the amount of data to be used.

The CPU 109 is connected to the Host bus line 105. The CPU 109 acquires the traffic information of the Host bus line 105 from a counter, not shown, which is supported by the Full Duplexer 107, and controls the Full Duplexer 107 in accordance with state of the traffic. Here, the first path (hereinafter, referred to as an existing path) 110 relates to a transmission path through which the AV data D2 stored in the storing device 108 is transferred to the PCI block 191 via the Full Duplexer 107, the Host bus line 105, the Host PCI bridge 104, the PCI bus line 103, and the bus 110'. The second path (hereinafter, referred to as a newly-established path) 118 relates to a transmission path which bypasses these Host bus line 105, Host PCI bridge 104, and PCI bus line 103, and directly connects the storing device 108 with the PCI block 191. The newly-established path 118 is not limited to one, but two or more of the newly-established paths 118 may be provided.

If the Host PCI bridge 104 transfers the AV data D2 to the storing device 108 via the Host bus line 105 when the use rate of the Host bus line 105 exceeds the upper limit thereof, the CPU 109 determines that the existing path 110 is busy. In this case, the CPU 109 controls the Full Duplexer 107 to use the newly-established path 118 for transferring the AV data D2 stored in the storing device 108 to the PCI block 191. Thus, the AV data D2 can be transferred to the PCI block 191 using an unoccupied path.

The PCI block 191 is connected to the CPU block 190 and includes a PCI controller 111, a PCI internal bus 112, a multi-path communication protocol processing section 113, a multi-path wireless section 114, a multi-path antenna group 116, and a DMA controller 119.

The multi-channel communication system is refereed to as a system in which the base station device 1, for example, transmits and receives data using the multi-path wireless section 114.

The DMA controller 119 is connected to the PCI internal bus 112. The DMA controller 119 performs any data transfer controls under a so-called bus master condition such that the CPU 109 can utilizes the Host bus line 105 preferentially to reduce the processing load to the CPU 109.

The PCI controller 111 is connected to the storing device 108 via the newly-established path 118 and the Full Duplexer 107, and further connected to the storing device 108 via the existing path 110. The PCI controller 111 transfers the AV data D2 received via the existing path 110 and/or the newly-established path 118 to the multi-path communication protocol processing section 113 via the PCI internal bus 112.

The multi-path communication protocol processing section 113 is connected to the PCI controller 111 via the PCI internal bus 112. The multi-path communication protocol processing section 113 performs any conversion processing using a protocol, for example, conversion processing into IP packets or multi-channels, on the AV data D2, which has been transferred from the PCI controller 111, in parallel to produce sending data D3 and outputs the converted data D3 to the multi-path wireless section 114. This allows the protocol-converted sending data D3 to be transferred to the monitoring device 2 by means of the multi-path wireless section 114. Thus, in the CPU block 190, the AV data D2 accumulated in the storing device 108 can be transferred to the PCI controller 111 utilizing an unoccupied path. On the other hand, in the PCI block 191, data conversion is performed in parallel using the protocol to produce the sending data D3, which is output to the multi-path wireless section 114. As a result, the throughput in the multi-path communication protocol processing section 113 is enhanced and the sending data D3 can be transferred and processed at high speed.

Figure 4:
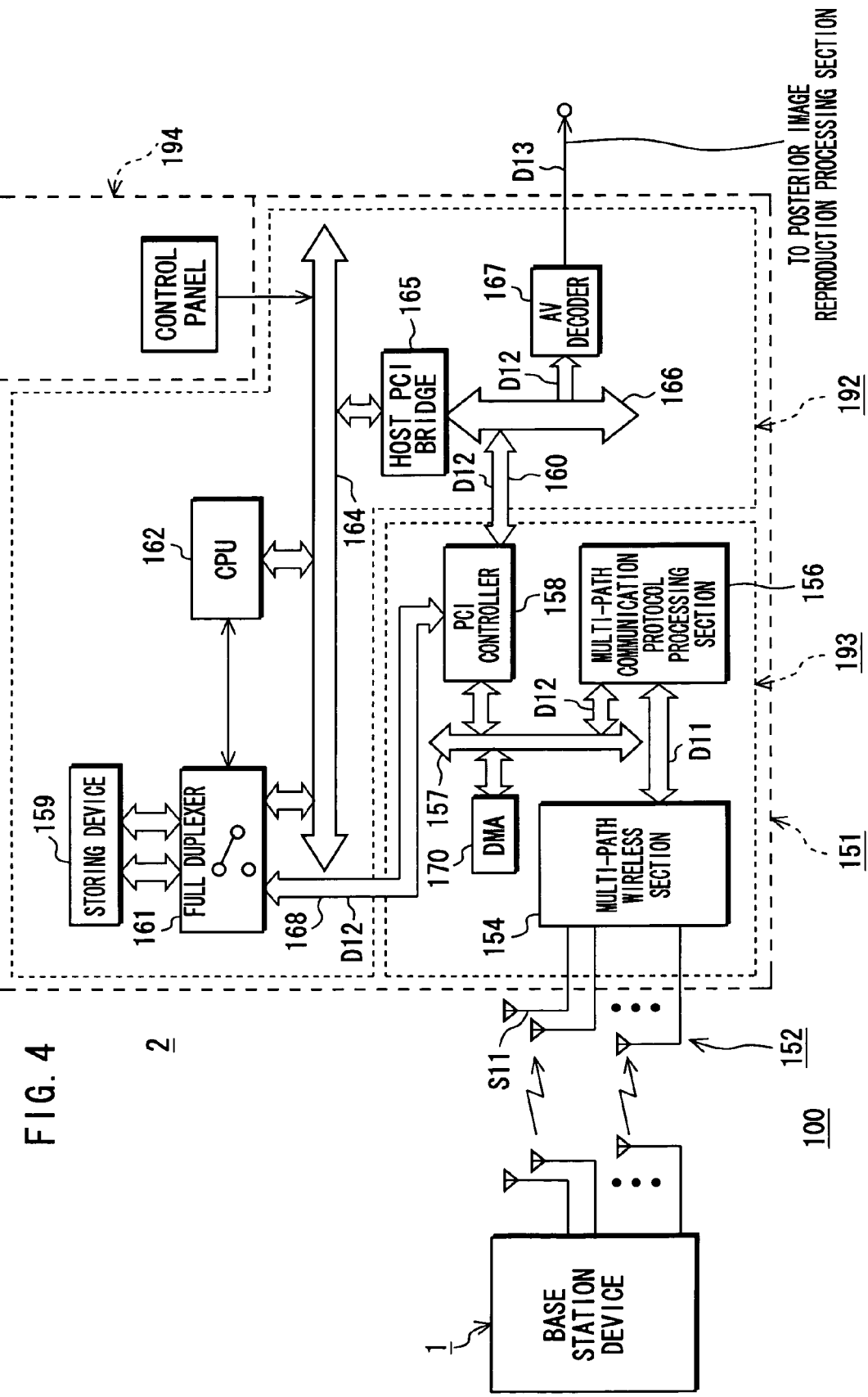
FIG. 4 is a block diagram for showing a configuration of a control system of an embodiment of a reception device, for example, a monitoring device, which is used in the system for transmitting and receiving data, according to the invention.

The multi-path wireless section 114 is connected to the multi-path communication protocol processing section 113, and converts the sending data D3 received from the multi-path communication protocol processing section 113 into a transmission radio signal S1. After that, using the multi-path antenna group 116 connected to the multi-path wireless section 114 enables the transmission radio signal S1 to be transmitted to the monitoring device 2.

the following will describe the monitoring device 2 in the system 100 for transmitting and receiving data. FIG. 4 shows a configuration of a control system of a reception device, for example, the monitoring device 2, in the system 100 for transmitting and receiving data. In the system 100 for transmitting and receiving data shown in FIG. 4, the monitor control unit 151 includes the CPU block 192 and the PCI block 193.

The PCI block 193 includes a multi-path antenna group 152, a multi-path wireless section 154, a multi-path communication protocol processing section 156, a PCI internal bus 157, a PCI controller 158, and a DMA controller 170.

The DMA controller 170 is connected to the PCI internal bus 157. The DMA controller 170 performs any data transfer controls under a so-called bus master condition such that the CPU 162 can utilizes the Host bus line 164 preferentially to reduce the processing load to the CPU 162.

The multi-path wireless section 154 has the multi-path antenna group 152. The multi-path wireless section 154 receives a reception radio signal S11 from the base station device 1 by means of the multi-path antenna group 152, and converts the received reception radio signal S11 into received data D11 to transfer it to the multi-path communication protocol processing section 156.

The multi-path communication protocol processing section 156 is connected to the multi-path wireless section 154. The multi-path communication protocol processing section 156 performs any data conversion on the receive data D11 received from the multi-path wireless section 154 in parallel using the protocol in such a manner that the data which has been subjected to the data conversion using the protocol such as, for example, conversion into IP packets or multi-channels, in the base station device 1 can be returned to the state of their original data, thereby producing AV data D12. After that, The multi-path communication protocol processing section 156 transfers the AV data D12 to the PCI controller 158.

The PCI controller 158 is connected to the multi-path communication protocol processing section 156 via the PCI internal bus 157, and transfers the AV data D12 received from the multi-path communication protocol processing section 156 to the CPU block 192.

The CPU block 192 is connected to the PCI block 193, and includes a storing device 159, a first path 160, a Full Duplexer 161, a CPU 162, a Host bus line 164, a Host PCI bridge 165, a PCI bus line 166, an AV decoder 167, and a second path 168.

The Host PCI bridge 165 is connected to the PCI controller 158 via the PCI bus line 166, and receives the AV data D12 from the PCI controller 158 to transfer the AV data D12 to the storing device 159 via the Host bus line 164 and the Full Duplexer 161.

Here, the first path (hereinafter, referred to as an existing path) 160 relates to a transmission path extending from the PCI controller 158 to the storing device 159 via the PCI bus line 166, the Host PCI bridge 165, the Host bus line 164, and the Full Duplexer 161. The second path (hereinafter, referred to as a newly-established path) 168 relates to a transmission path which bypasses these Host bus line 164, Host PCI bridge 165, and PCI bus line 166, and directly connects the storing device 159 with the PCI block 193. The newly-established path 168 is not limited to one, but two or more of the newly-established paths 168 may be provided.

Further, the storing device 159 is connected to the PCI controller 158 via the Full Duplexer 161 and the newly-established path 168, and further connected to the PCI controller 158 via the existing path 160. Then, the storing device 159 receives the AV data D12 from the PCI controller 158 and stores it. The Full Duplexer 161 is connected to the CPU 162, which controls its switch.

The CPU 162 is connected to the Host bus line 164. The CPU 162 acquires traffic information of the Host bus line 164 from a counter, not shown, which is held in the Full Duplexer 161, and controls the Full Duplexer 161 in accordance with the state of the traffic. For example, in the case where the AV data D12 stored in the storing device 159 have already been transferred to the AV decoder 167 via the Host bus line 164, and as a result of this, the use rate of the Host bus line 164 exceeds the upper limit thereof, the CPU 162 determines that the existing path 160 is busy. The CPU 162 controls the Full Duplexer 161 to use the newly-established path 168 for transferring the AV data D12 from the PCI controller 158 to the storing device 159. In this manner, the AV data D12 can be transferred to the storing device 159 using an unoccupied path. Thus, the PCI block 193 receives the reception radio signal S11 from the base station device 1 by utilizing the multi-path wireless section 154 in which data conversion is performed in parallel using the protocol. On the other hand, in the CPU block 192, the AV data D12 is transferred to the storing device 159 utilizing an unoccupied path. As a result, the throughput in the multi-path communication protocol processing section 156 is enhanced, thereby enabling the AV data D12 to be transferred and processed at high speed.

The AV decoder 167 is connected to the storing device 159 via the PCI bus line 166, the Host PCI bridge 165, the Host bus line 164, and the Full Duplexer 161. The AV decoder 167 performs, for example, data extension to the AV data D12 received from the storing device 159 to produce AV data D13 and to output the AV data D13 to the posterior image reproduction processing section and the like.

The following will describe an example of data transmission performed in the base station control unit 101 of the block diagram shown in FIG. 3 of the system 100 for transmitting and receiving data.

EMBODIMENT 1

Figure 5:
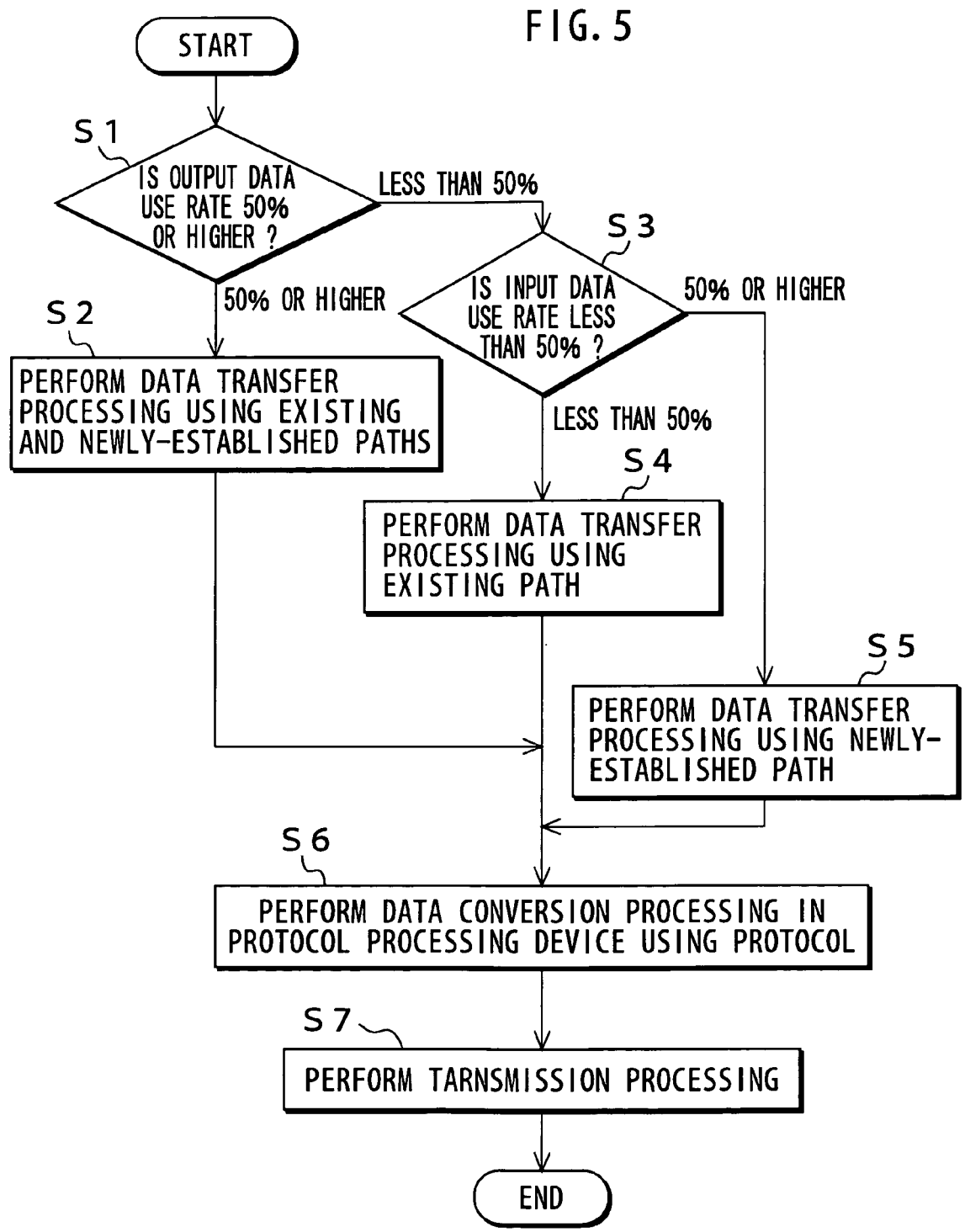
FIG. 5 is a flow chart for showing an embodiment of data transmission in the system for transmitting and receiving data.

FIG. 5 is a flow chart for showing an example of data transmission in the system 100 for transmitting and receiving data. In this example, it is assumed that the CPU 109 monitors the traffic in the Host bus line 105. For example, the Full Duplexer 107 holds data input counter and output counter, which are not shown, at the interface with the Host bus line 105. Every time when the AV data D2 are input and output, the size thereof is added to each counter. The data input counter counts the data transferred to the storing device 108, whereas the data output counter counts the data transferred from the storing device 108. The CPU 109 reads these counters every predetermined time intervals, so that the amount of each traffic of the individual input data and output data can be calculated. The amount of each traffic is divided by the maximum available transmission amount of data in the Host bus line 105, so that use rate of each of the items of input data and output data with respect to the Host bus line 105 can be calculated.

It is tentatively assumed that the use rate of 50% or higher is indicative of a large amount of traffic, whereas less than 50% is indicative of a small amount of traffic. When the use rate of output data is 50% or higher (hereinafter, referred to as "a first determination state"), the existing path 110 and the newly-established path 118 are used. Contrarily, when the use rate of output data is less than 50% and the use rate of input data is less than 50% (hereinafter, referred to as "a second determination state"), the existing path 110 is used. In other cases, that is, the use rate of output data is less than 50% and the use rate of input data is 50% or higher, the newly-established path 118 is used. The CPU 109 compares each of the calculated use rates of the Host bus line 105 and these reference values, and sets the Full Duplexer 107 to a real time.

Further, it is assumed that the AV data D2 is stored in the storing device 108. For example, the AV encoder 102 receives a television signal as AV data D1 via the television tuner 12. The AV encoder 102 performs data compression, for example, on the AV data D1 to produce the AV data D2. The resultant AV data D2 is transferred to the Host PCI bridge 104 via the PCI bus line 103, and the Host PCI bridge 104 transfers the AV data D2 to the storing device 108 via the Host bus line 105 and the Full Duplexer 107.

On condition that these processes are conducted for data transmission, in Step S1 in the flow chart shown in FIG. 5, the CPU 109 compares the calculated output data use rate with a first determination reference value.

When the CPU 109 determines that the output data use rate is 50% or higher, that is, when the CPU 109 is in the first determination state, the process goes to Step S2 where the CPU 109 controls the Full Duplexer 107 to use the existing path 110 and the newly-established path 118 as to the path setting. As a result of this control, the Full Duplexer 107 selects the existing path 110 and the newly-established path 118. As a result of this selection, the CPU 109 transfers the AV data D2 stored in the storing device 108 to the PCI controller 111 using the existing path 110 and the newly-established path 118. Then, the process goes to Step S6.

Contrarily, when the CPU 109 determines that the output data use rate is less than 50% in the Step S1, the process goes to Step S3 where the CPU 109 determines whether or not the input data use rate is less than 50%.

When the CPU 109 determines that the input data use rate is less than 50%, that is, the CPU 109 is in the second determination state, the process goes to Step S4 where the CPU 109 controls the Full Duplexer 107 to use the existing path 110 as to the path setting. As a result of this control, the Full Duplexer 107 selects the existing path 110. As a result of this selection, the CPU 109 transfers the AV data D2 stored in the storing device 108 to the PCI controller 111 using the existing path 110. Then, the process goes to the Step S6.

When the CPU 109 determines that the input data use rate is 50% or higher, the process goes to Step S5 where the CPU 109 controls the Full Duplexer 107 to use the newly-established path 118 as to the path setting. As a result of this control, the Full Duplexer 107 selects the newly-established path 118. As a result of this selection, the CPU 109 transfers the AV data D2 stored in the storing device 108 to the PCI controller 111 using the newly-established path 118. Then, the process goes to the Step S6.

In the Step S6, the multi-path communication protocol processing section 113 receives the AV data D2 and performs data conversion processing such as conversion into IP packets or multi-channels on the AV data D2 in parallel using a protocol. In this manner, the converted AV data D2 can be transmitted to the monitoring device 2 by utilizing the multi-path wireless section 114. After that, the process goes to Step S7 where the multi-path communication protocol processing section 113 transfers the converted AV data D2 to the multi-path wireless section 114 which transmits it to the monitoring device 2 as a transmission radio signal S1 using the multi-path antenna group 116 disposed in the multi-path wireless section 114.

As described above, according to the data transmission in an embodiment of the system 100 for transmitting and receiving data relative to the present invention, when mass AV data is transmitted between the base station device 1 and the monitoring device 2 by utilizing the multi-path wireless section 114, the base station device 1 transfers the AV data D2 stored in the storing device 108 to the multi-path communication protocol processing section 113 utilizing an unoccupied path, whereas the multi-path communication protocol processing section 113 performs data conversion processing on the AV data D2 in parallel using a protocol to produce the sending data D3, and transmits the sending data D3 to the monitoring device 2 by means of the multi-path wireless section 114. This enables the throughput in the multi-path communication protocol processing section 113 to be enhanced, thereby allowing the AV data D2 to be transferred and processed at high speed.

The following will describe an example of data reception in the system 100 for transmitting and receiving data shown in the block diagram of FIG. 4.

EMBODIMENT 2

Figure 6:
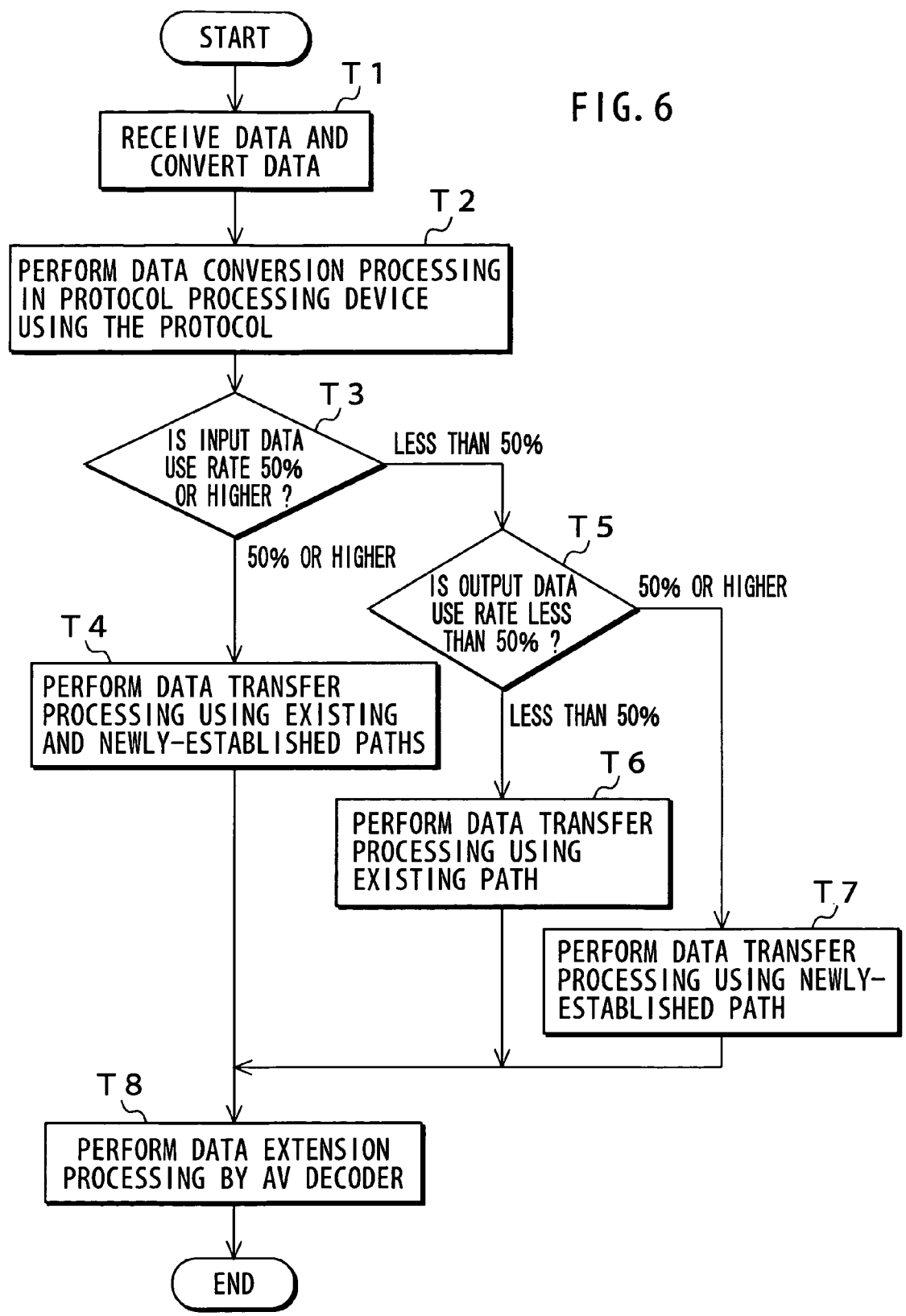
FIG. 6 is a flow chart for showing an embodiment of data reception in the system for transmitting and receiving data.

FIG. 6 is a flow chart for showing an example of data reception in the system 100 for transmitting and receiving data. In this embodiment, it is assumed that the CPU 162 monitors the traffic in the Host bus line 164. For example, the Full Duplexer 161 holds a data input counter and a data output counter, which are not shown, at the interface with the Host bus line 164. Every time when the AV data D12 are input and output, the size thereof is added to each counter. The data input counter counts the data transferred to the storing device 159, whereas the data output counter counts the data transferred from the storing device 159. The CPU 162 reads these counters every predetermined time intervals, so that the amount of traffic of each of the items of input data and output data can be calculated. The amount of traffic is divided by the maximum transmission amount of the Host bus line 164, so that use rate of each of the items of the input data and output data for the Host bus line 164 can be calculated.

It is tentatively assumed that the use rate of 50% or higher is indicative of a large amount of traffic, whereas less than 50% is indicative of a small amount of traffic. When the use rate of input data is 50% or higher (hereinafter, referred to as "a first determination reference value"), the existing path 160 and the newly-established path 168 are used. Contrarily, when the use rate of input data is less than 50% and the use rate of output data is less than 50% (hereinafter, referred to as "a second determination reference value"), the existing path 160 is used. In other cases, that is, the use rate of input data is less than 50% and the use rate of output data is 50% or higher, the newly-established path 168 is used. The CPU 162 compares each of the calculated use rates of the Host bus line 164 and these reference values, and sets the Full Duplexer 161 to a real time.

On condition that these processes are conducted for data reception, in Step T1 in the flow chart shown in FIG. 6, the monitoring device 2 receives the reception radio signal S11 from the base station device 1 using the multi-path antenna group 152 disposed in the multi-path wireless section 154. Then, the multi-path wireless section 154 converts the reception radio signal S11 into reception data D11, and transfers it to the multi-path communication protocol processing section 156. Then, the process goes to Step T2 where the multi-path communication protocol processing section 156 receives the parallel reception data D11, which has been subjected to data conversion, using a protocol, such as, for example, conversion into IP packets or multi-channels, in the base station device 1, and performs data conversion processing on the parallel reception data D11 using the same protocol as the one used in the base station device 1 to produce the AV data D12 that is returned to the original AV data D2. The multi-path communication protocol processing section 156 then transfers the AV data D12 to the PCI controller 158 via the PCI internal bus 157.

The process then goes to Step T3 where the PCI controller 158 acquires the result of the comparison made by the CPU 162 between the first determination reference value and the calculated input data use rate.

When the CPU 162 compares the calculated input data use rate with the first determination reference value to determine that the input data use rate is 50% or larger and the PCI controller 158 acquires the result of the determination, the process goes to Step T4. The CPU 162 controls the Full Duplexer 161 to use the existing path 160 and the newly-established path 168 as to the path setting. As a result of this control, the Full Duplexer 161 selects the existing path 160 and the newly-established path 168. As a result of this selection, the PCI controller 158 transfers the AV data D12 received from the multi-path communication protocol processing section 156 to the storing device 159 utilizing the existing path 160 and the newly-established path 168.

Contrarily, when the CPU 162 compares the calculated input data use rate with the first determination reference value to determine that the input data use rate is less than 50%, and the PCI controller 158 acquires a result of the determination, the process goes to Step T5. The CPU 162 compares the calculated output data use rate with the second determination reference value.

When the CPU 162 compares the calculated output data use rate with the second determination reference value to determine that the output data use rate is less than 50% and the PCI controller 158 acquires a result of the determination, the process goes to Step T6. The CPU 162 controls the Full Duplexer 161 to use the existing path 160 as to the path setting. As a result of this control, the Full Duplexer 161 selects the existing path 160. As a result of this selection, the PCI controller 158 transfers the AV data D12 received from the multi-path communication protocol processing section 156 to the storing device 159 utilizing the existing path 160.

Further, when the CPU 162 compares the calculated output data use rate with the second determination reference value to determine that the output data use rate is 50% or larger and the PCI controller 158 acquires a result of the determination, process goes to Step T7. The CPU 162 controls the Full Duplexer 161 to use the newly-established path 168 as to the path setting. As a result of this control, the Full Duplexer 161 selects the newly-established path 168. As a result of this selection, the PCI controller 158 transfers the AV data D12 received from the multi-path communication protocol processing section 156 to the storing device 159 utilizing the newly-established path 168.

The process then goes to Step T8 where the AV data D12 stored in the storing device 159 is transferred to the AV decoder 167 via the Full Duplexer 161, the Host bus 164, the Host PCI bridge 165, and the PCI bus line 166. The AV decoder 167 performs, for example, data extension processing on the transferred AV data D12 to produce AV data D13, and outputs the AV data D13 to the posterior image reproduction processing section and the like.

As described above, according to the data reception in an embodiment of the system 100 for transmitting and receiving data relative to the present invention, when mass AV data is received by means of the multi-path wireless section 154, in the monitoring device 2, the multi-path communication protocol processing section 156 performs data conversion processing on the parallel AV data D11 received from the base station device 1 using the same protocol used in the base station device 1 to produce the AV data D12 and the PCI controller 158 transfers the AV data D12 to the storing device 159 utilizing an unoccupied path. This allows the data to be transferred to the storing device 159 at high speed, thereby attaining data processing at high speed.

While the foregoing specification has described preferred embodiment(s) of the present invention, one skilled in the art may make many modifications, combinations, sub-combinations and alternations to the preferred embodiment(s) without departing from the invention in its broader aspects. The appended claims therefore are intended to cover all such the modifications, combinations, sub-combinations and alternations as fall within the true scope of the invention or the equivalents thereof.

What is claimed is:

1. A system for transmitting and receiving image and audio data comprising:
   a transmission apparatus that transmits the image and audio data using a multi-channel communication protocol, said transmission apparatus including
   a first protocol conversion device configured to produce parallel image and audio data for transmission to the reception apparatus using the multi-channel communication protocol,
   a storing device configured to store the image and audio data,
   a first data path between the storing device and the first protocol conversion device,
   a second data path between the storing device and the first protocol conversion device,
   a full duplexer configured to count a rate of data being stored to the storing device from the first data path to produce a storing device input rate, to count a rate of data being output to the first data path from the storing device to produce a storing device output rate, and to control a transfer of data between the storing device and the first and second data paths in accordance with a control signal, and
   a control device configured to generate the control signal based on the storing device input rate and the storing device output rate; and
   a reception apparatus that receives the parallel image and audio data transmitted using the multi-channel communication protocol, said reception apparatus including a second protocol conversion device configured to perform data conversion processing on the received parallel image and audio data and to output the converted image and audio data for display by a display device.

2. The system according to claim 1, wherein
the control device is further configured to generate the control signal based on the storing device input rate, the storing device output rate, a predetermined input data threshold, and a predetermined output data threshold.

3. The system according to claim 2, wherein
the first data path includes a first bus, a second bus, and an interface between the first bus and the second bus, and the second data path provides a direct connection between the storing device and the first protocol conversion device.

4. The system according to claim 2, wherein
the control device is further configured to generate the control signal to control the full duplexer to transfer the image and audio data between the storing device and the second data path, when the storing device input rate is greater than the predetermined input data threshold.

5. The system according to claim 2, wherein
the control device is further configured to generate the control signal to control the full duplexer to transfer the image and audio data between the storing device and the second data path, when the storing device output rate is greater than the predetermined output data threshold.

6. A transmission apparatus that transmits image and audio data using a multi-channel communication protocol, comprising:
   a storing device configured to store the image and audio data;
   a protocol conversion device configured to perform data conversion processing on the image and audio data using a protocol to produce parallel image and audio data;
   a first data path between the storing device and the protocol conversion device;
   a second data path between the storing device and the protocol conversion device;
   a full duplexer configured to count a rate of data being stored to the storing device from the first data path to produce a storing device input rate, to count a rate of data being output to the first data path from the storing device to produce a storing device output rate, and to control a transfer of data between the storing device and the first and second data paths in accordance with a control signal;
a control device configured to generate the control signal based on the storing device input rate and the storing device output rate; and
a data transmission device configured to transmit the parallel image and audio data, converted by the protocol conversion device, to a reception apparatus using the multi-channel communication protocol.

7. The transmission apparatus according to claim 6, wherein
the control device is further configured to generate the control signal based on the storing device input rate, the storing device output rate, a predetermined input data threshold, and a predetermined output data threshold.

8. The transmission apparatus according to claim 7, wherein
the first data path includes a first bus, a second bus, and an interface between the first bus and the second bus, and the second data path provides a direct connection between the storing device and the first protocol conversion device.

9. A reception apparatus that receives parallel image and audio data using a multi-channel communication protocol, comprising:
a data-receiving device configured to receive the parallel image and audio data from a transmission apparatus using the multi-channel communication protocol;
a protocol conversion device configured to perform data conversion processing on the received parallel image and audio data using a protocol to produce image and audio data;
a storing device configured to store the image and audio data;
a first data path between the storing device and the protocol conversion device;
a second data path between the storing device and the protocol conversion device;
a full duplexer configured to count a rate of data being stored to the storing device from the first data path to produce a storing device input rate, to count a rate of data being output to the first data path from the storing device to produce a storing device output rate, and to control a transfer of data between the storing device and the first and second data paths in accordance with a control signal; and
a control device configured to generate the control signal based on the storing device input rate and the storing device output rate.

10. The reception apparatus according to claim 9, wherein
the control device is further configured to generate the control signal based on the storing device input rate, the storing device output rate, a predetermined input data threshold, and a predetermined output data threshold.

11. The reception apparatus according to claim 10 wherein
the first data path includes a first bus, a second bus, and an interface between the first bus and the second bus, and the second data path provides a direct connection between the storing device and the first protocol conversion device.

12. A method for transmitting and receiving image and audio data between a transmission apparatus and a reception apparatus using a multi-channel communication protocol, comprising:
storing the image and audio data to a storing device;
counting a rate of data being stored to the storing device from a first data path to produce a storing device input rate;
counting a rate of data being output to the first data path from the storing device to produce a storing device output rate;
controlling a transfer of data between the storing device and the first data path and the storing device and a second data path, based on the storing device input rate and the storing device output rate;
performing data conversion processing on the image and audio data using a protocol to produce parallel image and audio data;
transmitting, by a transmission apparatus, the parallel image and audio data to a reception apparatus using the multi-channel communication protocol;
receiving the parallel image and audio data using the multi-channel communication protocol; and
performing data conversion processing on the received parallel image and audio data using the protocol.

13. The method according to claim 12, wherein
the controlling the transfer of data further includes controlling the transfer of data based on the storing device input rate, the storing device output rate, a predetermined input data threshold, and a predetermined output data threshold.

14. The method according to claim 13, wherein
the first data path includes a first bus, a second bus, and an interface between the first bus and the second bus, and the second data path provides a direct connection between the storing device and the first protocol conversion device.

\* \* \* \* \*